Patented Oct. 11, 1938

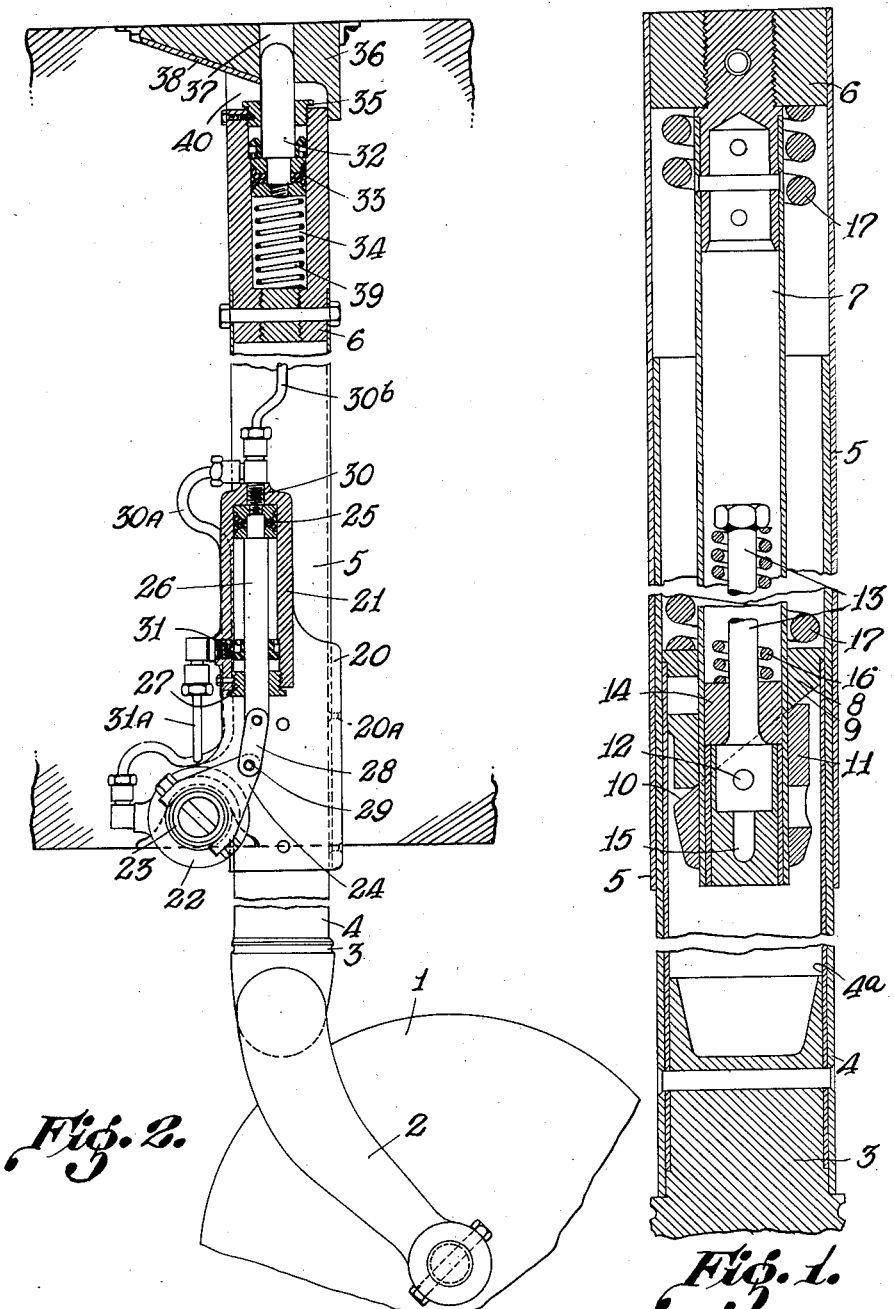

2,132,682

UNITED STATES PATENT OFFICE 2,132,682

TAIL WHEEL AND THE LIKE FOR AIRCRAFT

George Herbert Dowty, Cheltenham, England

Application April 15, 1936, Serial No. 74,603
In Great Britain April 17, 1935

6 Claims. (Cl. 244—102)

An object of the present invention is to provide a tail wheel or skid mounting for aircraft which as well as having the ordinary advantages with regard to shock absorption, is arranged to be retractable for the purpose of reducing aerodynamic drag. A further object resides in a certain construction of tail wheel mounting which will enable resilience to be obtained under ground load conditions, and maybe damping of action of such resilience together with a required degree of self-centering especially in the unloaded condition, for the purpose of making it ready for retraction. By this means, owing to the self-centering characteristic, the minimum space may be taken up by the housing or cavity for the wheel when it is retracted. A further object of the invention is the provision of a tail wheel mounting constituted by a unitary structure which includes all the desired shock-absorbing means, means for allowing castoring of the wheel, damping means, and the like, and which is mountable pivotally for retraction by swinging about an axis in the fuselage of an aeroplane, and may have means for effecting the desired angular movements, mounted for the most part on, or carried bodily by, the unitary structure. A further object is the adaptation of a jack or like force-applying unit to effect retraction of the tail wheel although carried by the tail wheel structure, and moving therewith. Yet another object is a means for locking or fixing the tail wheel in an extended and maybe in a retracted position, which locking means may be rendered virtually automatic in operation. Thus a tail wheel mounting in which there may be shock absorbing devices incorporated in a support, whilst allowing full 360° rotation for castoring, may have automatic means for neutrally locating or aligning the wheel when it is unloaded, and maybe means for restraining castoring rotation frictionally or otherwise, in which case such restraining means are rendered less or non-effective when the wheel is unloaded so as not to oppose the aligning device in its action. Tail wheels tare at present in use, mounted so as to castor, i. e. to trail in a direction according to the track of movement when running on the ground, and the invention has this type in mind. In the following specification "load" and "loaded" refer to those loads on a tail wheel or skid which normally exist when an aircraft is on the ground, either stationarily or taxying or landing, and "unloaded" means when the aircraft is air-borne or the tail is off the ground, although there may, as will be appreciated, be some (e. g. aerodynamic) loads on a tail wheel even in this condition.

By way of example, the features of the invention which, in its preferred construction, are used in combination, but which may be extensively varied in detail, are illustrated in the annexed diagrammatic drawing, in which:—

Figure 1 shows the aligning means and indicates damping and recoil springing means in a tail wheel pillar, mostly in section.

Figure 2 is a partly sectioned view of the complete tail wheel mounting showing its means of retraction and its locking means, and imagined as containing the structure of Figure 1.

In these figures the tail wheel is indicated at 1; it is carried by an appropriate fork or arm 2 integral with a boss 3 which is pinned in the bottom end of an inner sliding tube 4 (with a liner 4A) which forms a telescoping part of the mounting of which the complementary part is the anchored outer tube 5. The outer tube 5 has in its upper end a plug fitting 6 which rigidly locates an inner stem 7 with tube 5. The stem 7 is in fact also a tube, for lightness.

In the upper end of tube 4 is fixed a partially cylindrical annular part 8 which is free to slide over stem 7, and the lower edge 9 of which is formed diagonally as it were, to co-operate with a complementary edge at 10 of a sleeve member 11 which is slidably carried on the lower end of the stem 7. The member 11 is connected by a diametrical pin 12 with a short rod 13 within the stem 7, this rod 13 also being slidably carried by the stem, in a fixed bush 14 for example. Axially-directed slots 15 in the wall of the stem 7, allow the requisite axial freedom to the pin 12 but prevent the relative rotation of the stem 7 and the parts 11, 12, 13. A recoil compression spring 16 restrains the axial freedom and, by acting between rod 13 and bush 14, tends to keep the member 11 in an up position, but yieldably.

Between the annular part 8 (i. e. the top of the tube 4) and the fitting 6, is a main compression spring 17 which thus, (in deflecting) resists contractile telescoping of the tubes 4, 5, in loaded condition. In deflecting thus, however, the surfaces 9, 10, separate, and the travels and spring strength are so arranged that in loaded condition these surfaces are quite out of engagement. Then they cannot affect relative rotation of tubes 4 and 5, which are thus free, so far as they are concerned, for unimpeded castoring or steering of the tail wheel. Conversely, when the tail is unloaded the spring 17 extends the "telescope" and forces 9 and 10 into engagement whereupon, by their inclination, they will restore the chosen alignment of the wheel if it leaves the ground unaligned, from any position except the highly improbable exactly reversed one, when a dead-centre might obtain.

Shock of recoil is relieved by yielding of part 11 against spring 16; this spring may also contribute to aligning, if for example the spring 17 is quite relaxed in the fully extended or unloaded state.

Turning now more especially to Figure 2 of the drawing, the type of mounting of Figure 1 has been adopted by way of example to illustrate a working combination. The boss 3 of the tail wheel fork 2 is attached within tube 4 which as already explained, is slidable within the tube 5, the upper end of which is plugged or closed by the fitting 6. The tube 5 is clipped by a thick encircling band 20 which may be secured by rivets as at 20A. Formed integrally with 20 or rigidly attached thereto is a cylinder 21 which, being external to tube 5, is parallel with it and close alongside it. The band 20 also has a projecting lug or boss at 22 which, with appropriate bearings, forms a pivotal attachment for the whole unit and which it fitted on to a spindle at 23 upon which the whole mounting is capable of swinging angularly for retraction. The spindle is carried rigidly across a convenient rear part of the fuselage (not shown) and preferably includes conduits for the conduction of operating liquid under hydraulic pressure. Secured immovably to the spindle or other appropriate part is a fixed arm 24.

Within the cylinder 21 there slides a double acting piston 25 with piston-rod 26 projecting through gland 27. The outer end of rod 26 is pivoted to a link 28 which is also pivoted at 29 to the arm 24. The cylinder 21 and piston 25 thus comprise a hydraulic jack capable of exercising moments of force about the axis of the spindle 23, the reactions of which moments will be capable of swinging the whole mounting from its functional position to a concealed or retracted position when the aeroplane is off the ground. The fact that the wheel 1 and fork 2 will then be properly orientated ensures that it may enter a suitably small opening in the fuselage to give practical effect to such swinging. The upper end of the cylinder 21 is fitted with a pipe connection 30, and the lower end similarly fitted at 31. Suitable connecting pipes 30A, 31A, connect the two ends of the cylinder to a suitable reversible source of hydraulic pressure.

The questions of alignment and of internal construction of the whole device having been dealt with, there remains the question of locking. It is regarded as necessary only to lock in the extended or functional position. Consequently the proposed lock is comprised by a bolt 32 with a domed or rounded end as shown, forming the rod of a double acting piston 33 sliding in a subsidiary hydraulic cylinder 34 which is formed in the fitting 6. The bolt 32 is coaxial with the tube 5 and projects from the upper end thereof through a suitable guide such as the gland nut 35. The bolt 32 of course has any suitable fluid-tight packing associated with it.

To the aeroplane there is secured a lock-plate 36 with a recess or hole in it at 37 to receive the end of and hold the bolt 32. The plate 36 has an inclined ramp 38 to thrust the bolt in against a compression spring 39 as the locked position is approached in swinging of the mounting. The plate also has a projecting wall or guide-flange 40, of V- or U-shape in plane, so as to ensure proper entry of the bolt 32 even if the structure were slightly misaligned for any reason. The cylinder 34 has suitable hydraulic connections (not shown) such as the continuation 30B of the pipe 30A, and these are so arranged, that the same pressure which acts to operate the piston 25 of the jack, first operates above piston 33 to free the bolt 32 from its recess 37, and thereafter the pressure of course swings the whole structure one way. On the return journey, whilst initial pressure by pipe 31A will re-extend the tail wheel, either the spring 39, or pressure if a second pipe opposed to 30B be provided, or both, will positively ensure that the bolt properly locks the whole mounting against inadvertent swinging.

It would probably be found possible, though not necessary, to use the same or another similar locking device, to lock the wheel fork 2 and wheel 1 against misalignment during retraction. At present however, it is only deemed necessary to provide the means shown and described in relation to Figure 1, for that object.

What I claim is:—

1. An aircraft tail support mounting comprising in combination a support carrying element, a mounting element carrying said support carrying element, shock absorbing means operative between said elements, means mounting the elements for castoring rotation, means for freeing said elements for castoring rotation when said shock absorbing means is loaded, means for restoring specific alignment between said elements when said shock absorbing means is unloaded, a bearing for attaching said mounting means to an aircraft, means operable independently of the shock absorbing and castoring means for swinging said mounting means, support carrying means, shock absorbing means, and castoring means as a whole about said bearing for retraction of the wheel.

2. A tail support mounting for aircraft, comprising in combination a tubular mounting element, a second and telescopic tubular support member carrying element telescopically slidably carried by the first element, resilient means for restraining relative telescopic movement of said elements, said second mentioned tubular element being adapted for castoring rotation about said first mentioned tubular element, means for relatively rotating said elements to a specific alignment about their common axis when said shock absorbing means are unloaded, said means comprising an angular part and a cooperating sleeve member said angular part and said member having inclined cooperating faces, and means for swinging the unit comprised by the above combination about a bearing.

3. An aircraft tail support mounting comprising a telescopic longitudinally resilient structure containing shock absorbing means, castoring means, a support member carried thereby, means for specifically realigning the support member when unloaded, all of said means being embodied in a unit, a single bearing for attaching the unit to an aircraft, a hydraulic jack supported by said unit for swinging same about said bearing, and a releasable lock for preventing such swinging under control.

4. A retractable tail support mounting for aircraft comprising a telescopic, shock absorbing, castoring, tubular support member supporting unit, a bearing for attaching the stationary part of said unit to an air craft, a double acting hydraulic jack supported by said unit and adapted to be connected to said aircraft, a hydraulically releasable lock carried by said unit remotely from said bearing for preventing swinging in the extended position of the unit, common hydraulic pressure control means for said jack and said lock, and resilient means for operating the lock in the extended position of the unit.

5. In a tail support mounting for aircraft having slidable telescopic tubes housing a shock absorbing spring and self-aligning castoring means operative in the unloaded condition, the combination with one of said tubes of a bearing for attaching the same to the aircraft, and means carried by said tube for causing the same to swing about said bearing and for locking same against swinging under control.

6. A retractable tail support mounting for aircraft comprising a mounting member, a tubular support member supporting unit telescopically mounted in said first member, said unit having a band provided with a boss defining a bearing, a spindle adapted to be mounted in an airplane fuselage and journaled by the bearing, a cylinder carried by the band, a double-acting piston carried by the cylinder, means connecting the piston with the spindle, and pipe connections for the cylinder, said piston being operable by a fluid entering the cylinder through certain of said pipe connections for cooperating with the spindle and shifting the unit defined by said band and first mentioned member and last mentioned unit about the bearing to a retracted position in the fuselage.

GEORGE HERBERT DOWTY.